Figure 1:
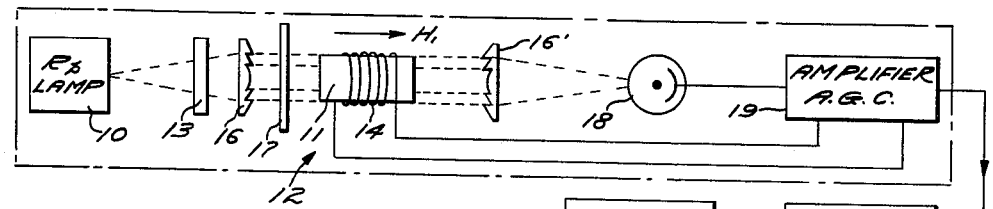

May 17, 1966     K. A. RUDDOCK ET AL     3,252,081

OPTICAL MAGNETOMETER AND GRADIOMETER

Filed Sept. 16, 1960

Inventors
Kenneth A. Ruddock
William E. Bell
Arnold L. Bloom
James T. Arnold
Lynn R. Sarles By Wm Nolan
Attorney 3,252,081
OPTICAL MAGNETOMETER AND GRADIOMETER
Kenneth A. Ruddock and William E. Bell, Palo Alto,
Arnold L. Bloom, Los Altos, James T. Arnold, Mountain View, and Lynn R. Sarles, Menlo Park, Calif., assignors to Varian Associates, Palo Alto, Calif., a corporation of California
Filed Sept. 16, 1960, Ser. No. 56,484
16 Claims. (Cl. 324—.5)

The invention described herein was made in the performance of work under NASA contract and is subject to the provisions of Sec. 305 of the National Aeronautics and Space Act of 1958, Public Law 85–568 (72 Stat. 435; 42 U.S.C. 2457).

The present invention relates in general to novel improved magnetic field measuring methods and apparatus and more particularly to magnetometers and gradiometers.

In the copending U. S. application of Hans G. Dehmelt, Serial No. 653,180, filed April 16, 1957 assigned to the same assignee, now Patent 3,150,313 there is disclosed and claimed a novel optical magnetometer-oscillator based on newly discovered quantum mechanical properties of optical absorption. Briefly, this oscillator comprises an absorption cell containing an assemblage of atoms or other quantum systems characterized by a long-lived ground or metastable energy state which is split into a plurality of magnetic sublevels by an external unidirectional magnetic field. The quantum systems are aligned so that a first set of sublevels are over populated with respect to a second set of sublevels and this alignment is varied in a periodic manner by resonance precessions of the magnetic moment of said quantum systems so that in effect, this population excess is periodically exchanged between said first and second sublevel sets. An optical radiation beam is then passed through said absorption cell with such spectral characteristics (frequency, intensity, polarization and direction) that it is more strongly absorbed by the quantum systems in one set of sublevels than by those in the other set, whereby the precessing quantum systems introduce a well defined periodic intensity modulation of the beam. This intensity modulated beam is intercepted by an optical detector to produce a high frequency signal which is amplified and fed back to the absorption cell in the form of a resonance frequency alternating magnetic field with the proper phase for sustaining the beam modulation by forced precession of the quantum systems, the high frequency feedback loop thereby undergoing continuous oscillation at a frequency determined by the precession frequency of the quantum systems. Since this precession frequency is a substantially linear function of the external unidirectional field, the strength of this field is continuously indicated by the feedback oscillation frequency.

In one example, the absorption cells contain a vapor of alkali atoms irradiated by a circularly polarized beam of alkali resonance radiation propagated at an angle to the external magnetic field. This beam serves the dual purpose of aligning the atoms by optical pumping and monitoring the precession frequency.

In another example, atoms of mercury vapor are aligned in a metastable state by spin exchange with a bombarding electron beam, and the modulated optical beam comprises plane polarized mercury resonance radiation directed at an angle to the magnetic field. In this example the light is modulated at twice the precession frequency so that a frequency divider is included in the feedback loop.

In a still further example, atoms of helium gas are maintained in a metastable state by an R.F. discharge and are irradiated by a helium radiation beam which serves a dual aligning and monitoring function.

It is the principal object of the present invention to provide an optical magnetometer of the above-described type characterized by an enhanced sensitivity, range and orientation independence.

One feature of the present invention is the provision of a photocell comprising a mosaic of small silicon cells in a series combination to provide optimum match to the amplifier.

Another feature of the present invention is the use of a novel silicon photovoltaic cell which operates at a net zero D.C. bias and improves the noise-to-signal level.

Another feature of the present invention is utilization of an amplifier circuit incorporating transistor switching to maintain a forced precession of the sample by changing the phase relationship of the R.F. component of the magnetic field surrounding the sample.

Still another feature of the present invention is the utilization of a novel radiometer which uses the outputs from two spaced magnetometer oscillator circuits and measures the gradient of the field detected by the magnetometers.

Figure 2:
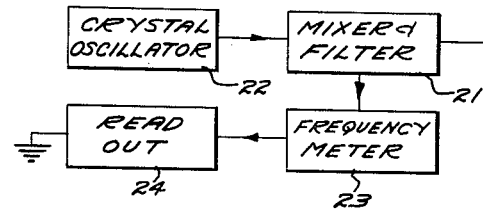
Figure 5:
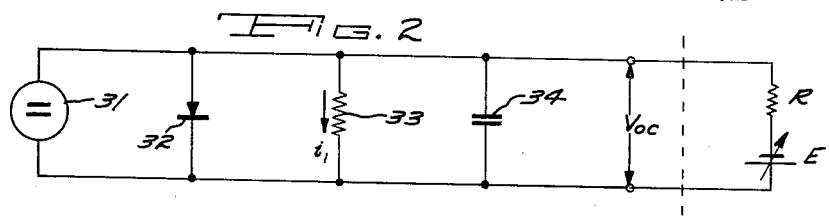
Figure 3:
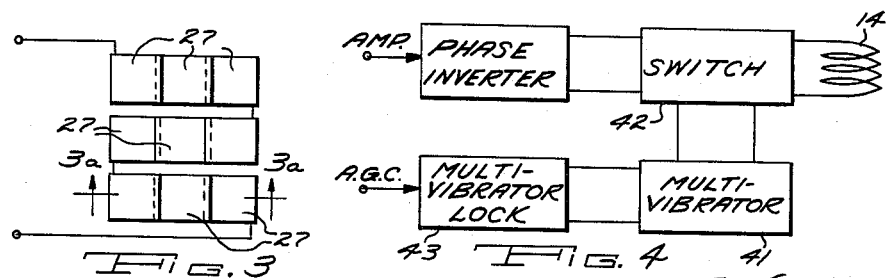
Figure 4:
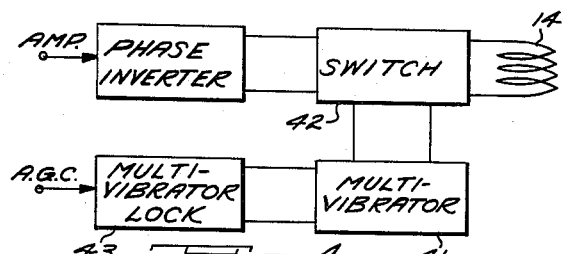
Figure 3A:
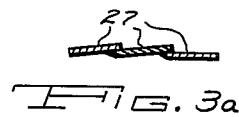

These and other features of the present invention will become more apparent upon a perusal of the following specification and drawings wherein, FIG. 1 shows the block diagram of a rubidium vapor magnetometer, FIG. 2 shows the equivalent circuit of an improved photodetector circuit operating at a net zero D.C. bias, FIG. 3 shows a series network of silicon solar cells used as photodetectors, FIG. 3a is a cross-section view of FIG. 3 taken along the line 3—3 in the direction of the arrows, FIG. 4 shows the block diagram of the phase reversal system required for oscillation in both magnetic hemispheres, and FIG. 5 shows a block diagram of a station gradiometer utilizing a field bias coil.

Referring now to FIG. 1 there is shown in block diagram form a magnetometer of the present invention. The magnetometer is broken into two main units, oscillator unit 12 and the read-out portion of the magnetometer. A rubidium lamp 10 emits a beam of light which is filtered by filter 13 to block out the 7800 angstrom portion of the Rb light spectrum. The remaining light then passes through a Fresnel lens 16 and through a circular polarizer 17 and through a rubidium 85 vapor cell 11 wherein the light beam intensity is modulated at a frequency porportional to the intensity of the magnetic field present. The modulated light beam then passes through a second Fresnel lens 16' which focuses the beam onto a photocell 18 where the modulated light is converted into electrical energy. The electrical signal from the photocell 18 is then fed to an amplifier and AGC unit 19. One of two outputs from the amplifier and AGC leads to an R.F. coil 14 surrounding the Rb vapor cell 11 to maintain oscillation at a frequency of 4.66 cycles per gamma. For example, in the earth's field of 0.5 gauss, the frequency is 233 kc. The other output from the amplifier-AGC unit 19 is fed into a mixer-filter 21 where it is then mixed with the output frequency from a crystal oscillator 22. The frequency difference between the stable output crystal oscillator and the Rb oscillator is then fed to a frequency meter 23 and thence to any standard read-out 24, for instance, a graphic recorder where the difference frequency may easily be converted into measurements of magnetic intensity The output of the photocell at 233 kc. as a function of the driving frequency and magnetic field is almost exactly the same as that of a tuned circuit whose Q is determined by the line width and whose center frequency is the Larmor frequency. The sensitivity of magnetometers of the present type has been measured at about 0.018 gamma, which is approximately 10 to 100 times as sensitive as any known magnetometer.

The lamp 10 is a spectral lamp of rubidium vapor operated as an electrodeless discharge with an excitation frequency of about 100 megacycles. The parts have been chosen to be nonmagnetic in operation to avoid distortion of the magnetic field being measured, and the power consumption of the entire lamp, including filaments, is about 6 watts. The heat generated in the lamp, primarily by the oscillator tube filaments, is also used to maintain the lamp bulb at proper operating temperature and is diffused down the magnetometer body to maintain the rubidium vapor cell also in its correct operating temperature of about 40° centigrade. For a fuller description of this lamp, reference is made to U.S. Patent 3,109,960.

The vapor cell 11 contains, for example, rubidium enriched in the Rb 85 isotope at a pressure of about $10^{-6}$ millimeters Hg and a buffer gas which is usually neon at about 3 cm. Hg. The purpose of the buffer gas is to insure that the atoms do not diffuse to the wall rapidly and thereby, by remaining in the useful space for long periods of time, provide long relaxation times, and consequently the narrow line widths which lead to high sensitivity. Of the various alkali metals, Rb has the advantage that the resultant operating temperature (about 40° centigrade) is ideal for field operating conditions. Rubidium has two naturally occurring isotopes, rubidium 85 and 87. Although Rb 87 has a higher Larmor frequency in a given magnetic field, Rb 85 is used in the exemplary embodiment because the lower Larmor frequency minimizes amplifier bandpass problems.

The gas cell geometry is determined primarily by its compatibility with the operating temperature, the optical path, and the solid angle of resonant scattered light subtended by the photodetector. In the exemplary embodiment, the cell 11 is cylindrical with flat Pyrex end windows carefully strain-relieved to provide optimum optical transparency for the polarized Rb light.

The photodetector 18 is preferably a mosaic of silicon solar cells best seen in FIGS. 3 and 3a. These devices have the necessary frequency response combined with high sensitivity to the rubidium light and are made of a mosaic of overlapping cells 27 soldered together like shingles in a series fashion, to reduce the capacitance and thereby increase the impedance of the overall photocell. This improves the signal-to-noise ratio to the input of the amplifier as transistor amplifiers better utilize a high input impedance. In addition, the cells 27 are completely nonmagnetic which is very desirable so as not to disturb or distort the magnetic field which is being measured. Further advantage in the use of the present silicon cells is that a 90° phase shift is obtained in the higher frequency range since the capacitive reactance 34 is small compared to the resistance 33 in the equivalent circuit of the photocell, shown in FIG. 2. This phase shift is required for maintaining oscillations when the coil is wound coaxial with the instrument axis as shown in FIG. 1 to give maximum orientation independence. With the coil in this position, the alternating magnetic field direction is constrained to be the same as the direction of light propagation thereby eliminating orientation-dependent phase shifts in the intensity modulation of said light. It is noted that the silicon cells provided may not give a complete 90° phase shift at the lower oscillation frequencies encountered in fields less than 10,000 gamma. This may be compensated, for example, by adding external shunt capacitance to the cell circuit, or by reducing the photocell phase shift to zero with a low reactance shunt and adding a 90° phase shifter to the amplifier.

The noise figure of the silicon cell is markedly improved when it is operated at a net zero D.C. bias by reducing noise caused by the D.C. current present in the photocell circuit. This may be accomplished with a feedback arrangement or the load may be simply a transformer primary with a low D.C. resistance but high A.C. impedance. An equivalent circuit of a photovoltaic p-n (photocell) junction is shown in FIG. 2. A generator 31 delivers the photocurrent to an ideal diode 32 and to an internal shunt resistance 33. The (low frequency) noise voltage from such a semiconductor is usually thought to be associated with current fluctuations $i_1$ through resistor 33. Thus, any method for reducing the static current through resistor 33 should reduce noise. The simplest scheme for doing this uses a load impedance A.C. transformer primary with low D.C. resistance. This shunts most of the current away from resistor 33. Another scheme used is shown in FIG. 2 where a load resistance R and a source of variable E.M.F. E is used to reduce $i_1$ to zero. E will be made to balance $V_{oc}$ to 0 for D.C. Thus, $i_1$ is cancelled and a factor of approximately 5 improvement signal-to-noise is obtained.

The self-oscillator in its simplest form has been found subject to an orientation-dependent hemisphere effect whereby oscillations which are maintained in a given field will cease if the direction of the unidirectional field relative to the optical or instrument axis is reversed unless the polarity of the R.F. driving coil is reversed simultaneously. The hemisphere effect may be compensated by the use of a switching amplifier which operates an electronic relay or switch 42 interchanging coil terminals and repeating until a signal is found at which time the relay is locked by multivibrator lock 43. The switching which takes place in the amplifier-AGC circuit 19 of FIG. 1, may be accomplished as shown in block diagram form in FIG. 4, by either a relay or transistor switch 42 that is controlled by a transistor multivibrator 41. One multivibrator state results in one phase of current through R.F. driving coil 14 and the other multivibrator state results in a 180° phase reversal of said current. In a magnetometer dead zone with the instrument axis orientated substantially at right angles to the unidirectional field, the multivibrator switches at about 2 cycles per second, hunting for the proper phase to initiate oscillation. As the magnetometer orientation shifts out of the dead zone, oscillation will start with one or other of the phase conventions. The oscillation results in a build-up of the automatic gain control voltage in the amplifier. The AGC voltage actuates the multivibrator lock 43 so that the phase of $H_1$ remains proper to sustain oscillation. As the dead zone is approached again, the oscillation amplitude will decrease thereby decreasing the AGC voltage and the multivibrator 41 will again start to hunt. It is important that the design of the amplifier is such as to yield a phase shift substantially zero over the expected operating dynamic range. Amplifiers that meet this requirement are well known in the art.

Two types of gradiometers in accordance with the present invention will be described, one of which is a station gradiometer while the other may be utilized as a moving system, for example, in an airplane searching deposits of ore or in geophysical exploration. Both types of gradiometers utilize the oscillator circuit shown in FIG. 1. In the station gradiometer, as shown in block diagram form in FIG. 5, the outputs $f(H_0)$ and $f(H_0 \pm \Delta H)$ from two magnetometer oscillator units such as 12 in FIG. 1 are fed into a phase detector 36. A field difference or gradient $\Delta H$ between the two oscillators would be indicated by the bias field coil 35 current required to make the field of oscillator 1 equal to the field of oscillator 2 by eliminating $\Delta H$. This difference may be measured by a voltmeter 38 without servo error as the current flowing through resistor 37 is the exact analog of the gradient.

The second gradiometer uses the same components as the magnetometer of FIG. 1 wherein a second Rb oscillator unit 12 is used as oscillator 22. Since the frequency of each oscillator is proportional to the field at which it is located, the beat frequency will be proportional to the field difference or gradient between the two coils.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. Apparatus for measuring magnetic fields comprising: an absorption cell containing an assemblage of quantum systems which may precess in a unidirectional magnetic field; means for propagating a beam of optical radiation through said absorption cell in a given direction with such spectral charcteristics as to be differentially absorbed with respect to the magnetic sublevels of said quantum systems whereby the intensity of the radiation passing through said cell is intensity modulated at a frequency which varies in accordance with the precession rate of said quantum systems; photoelectric means for converting the intensity modulation of the radiation passing through said absorption cell into an alternating electrical signal, said means comprising a mosaic of photovoltaic p-n junction cells; means for supporting an alternating magnetic field, said means being positioned to support an alternating magnetic field, said means being positioned to support an alternating magnetic field in said absorption cell which is constrained to extend in the propagation direction of said optical radiation whereby orientation-dependent phase shifts in said intensity modulation are eliminated; feedback means coupling said alternating electrical signal to said alternating magnetic field supporting means to establish on alternating magnetic field which produces forced precession of said quantum systems thereby effecting self-sustained oscillation of said alternating electrical signal at a frequency determined by the intensity of said unidirectional magnetic field at said absorption cell; and means responsive to said self-sustained oscillation for detecting and measuring said unidirectional magnetic field.

2. Apparatus according to claim 1 wherein said alternating magnetic field supporting means comprises a coil surrounding said absorption cell and disposed coaxially of the propagation direction of said optical radiation.

3. Apparatus according to claim 2 wherein said quantum systems are alkali atoms and the total phase shift of said alternating electrical signal through said photoelectric means and said feedback means is 90 degrees in order to maintain said forced precession.

4. Apparatus according to claim 3 wherein said photoelectric means provides the 90 degree phase shift and said feedback means includes a zero phase shift amplifier.

5. Apparatus according to claim 1 including means for establishing a net zero D.C. bias across said photovoltaic cells to improve the noise figure thereof.

6. Apparatus according to claim 1 wherein the relative orientation between said apparatus and said unidirectional magnetic field is reversible, and including means for reversing the phase of said alternating electrical signal coupled by said feedback means when the relative orientation between said apparatus and said unidirectional field is reversed thereby maintaining said condition of self-sustained oscillation.

7. Apparatus according to claim 1 including means for providing a frequency stable reference oscillation, and means for providing a signal responsive to the frequency difference between said self-sustained field-dependent oscillation and said stable oscillation, said signal indicating the intensity of the unidirectional magnetic field at said absorption cell.

8. Apparatus including two sets of apparatus according to claim 1 with spaced-apart absorption cells wherein a first self-sustained oscillation is maintained at a frequency determined by the intensity of a unidirectional magnetic field at one absorption cell, and a second self-sustained oscillation is maintained at a frequency determined by the intensity of said field at the other absorption cell, and including means for providing a signal responsive to the frequency difference between said oscillations, said signal indicating the gradient of the intensity of said unidirectional field between said absorption cells.

9. Apparatus according to claim 1 wherein said photovoltaic p-n junction cells are silicon p-n junction cells.

10. Apparatus according to claim 9 wherein said quantum systems are rubidium atoms in vapor form and said optical radiation is rubidium resonance radiation.

11. Apparatus according to claim 1 wherein said photovoltaic p-n junction cells are connected in series to thereby reduce the capacitance of said photoelectric means.

12. Magnetic resonance apparatus comprising: an optical absorption cell containing an assemblage of quantum systems which may exhibit magnetic resonance; means for generating a magnetic field in said absorption cell which induces said resonance; means for irradiating said absorption cell with optical radiation; and means responsive to periodically alternating components in the intensity of optical radiation issuing from said absorption cell for monitoring said magnetic resonance, said means including at least one photovoltaic p-n junction cell which converts said alternating components into a periodically alternating electrical signal, and means for establishing a net zero D.C. bias across said photovoltaic cell to improve the noise figure thereof.

13. Apparatus for measuring magnetic fields comprising: an absorption cell containing an assemblage of quantum systems which may precess in a unidirectional magnetic field, the relative orientation between said apparatus and said unidirectional field being reversible; means for propagating optical radiation through said absorption cell wtih such spectral characteristics as to be differentially absorbed with respect to the magnetic sublevels of said quantum systems whereby the intensity of the radiation passing through said cell is intensity modulated at a frequency which varies in accordance with the precession rate of said quantum systems; photocell means for converting the intensity modulation of the radiation passing through said absorption cell into an alternating electrical signal; feedback means for coupling said signal to said absorption cell in the form of an alternating magnetic field which produces forced precession of said quantum systems thereby effecting self-sustained oscillation of said alternating electrical signal at a frequency determined by the intensity of said unidirectional field at said absorption cell; and means for reversing the phase of said alternating feedback signal when the relative orientation between said apparatus and said unidirectional field is reversed thereby maintaining said condition of self-sustained oscillation.

14. Apparatus according to claim 13 including means responsive to the level of said self-sustained oscillation means for actuating said phase reversal means whenever said level of oscillation falls below a predetermined value.

15. Apparatus according to claim 14 wherein said actuating means effects periodic phase reversals until said level of oscillation is greater than said predetermined value.

16. Apparatus according to claim 15 wherein said quantum systems are alkali atoms, said optical radiation is propagated through said absorption cell in a given direction, said alternating magnetic field is constrained to extend in the propagation direction of said optical radiation, and the total phase shift through said photocell means and said feedback means is 90 degrees.

(References on following page)

References Cited by the Examiner

UNITED STATES PATENTS

| | | | |
|---|---|---|---|
| 2,589,494 | 3/1952 | Hershberger | 324—0.5 X |
| 2,805,347 | 9/1957 | Haynes et al. | 250—211 |
| 2,845,595 | 7/1958 | Leete | 324—0.5 |
| 2,916,690 | 12/1959 | Leete | 324—0.5 |
| 2,951,992 | 9/1960 | Arditi | 331—3 |
| 2,967,946 | 1/1961 | Leisey | 250—218 |
| 3,024,695 | 3/1962 | Nisbet | 250—211 X |
| 3,103,621 | 9/1963 | Fraser | 324—0.5 |

OTHER REFERENCES

Mansir: Electronics, vol. 33, pp. 47 to 51 incl., Aug. 5, 1960.

Skillman et al.: Journal of Geophysical Research, vol. 63, No. 3, September 1958, pp. 513 to 515 incl.

Bell et al.: Physical Review, vol. 107, No. 6, Sept. 15, 1957, pp. 1554 to 1565 incl.

CHESTER L. JUSTUS, *Primary Examiner.*

MAYNARD R. WILBUR, *Assistant Examiner.*